United States Patent [19]

Lopez et al.

[11] Patent Number: 5,480,603
[45] Date of Patent: Jan. 2, 1996

[54] METHOD FOR PREPARING PREFORMS FOR MOLDING PROCESSES

[75] Inventors: Leonardo C. Lopez; Ronald R. Pelletier, both of Midland, Mich.

[73] Assignee: The Dow Chemical Company, Midland, Mich.

[21] Appl. No.: 246,020

[22] Filed: May 19, 1994

[51] Int. Cl.$^6$ .................................................. B29C 70/40
[52] U.S. Cl. ............................ 264/131; 264/137; 264/257
[58] Field of Search .................................... 264/134, 135, 264/137, 131, 257

[56] References Cited

U.S. PATENT DOCUMENTS

| | | | |
|---|---|---|---|
| 3,286,007 | 11/1966 | Wilkie et al. | 264/134 |
| 3,632,366 | 1/1972 | Hiraga et al. | 117/4 |
| 4,058,581 | 11/1977 | Park | 264/137 |
| 4,222,918 | 9/1980 | Zentner et al. | 260/29.2 EP |
| 4,264,655 | 4/1981 | Brook | 427/381 |
| 4,292,105 | 9/1981 | Taylor | 156/242 |
| 4,680,224 | 7/1987 | O'Connor | 428/294 |
| 4,882,114 | 11/1989 | Radvan et al. | 264/137 |
| 4,894,105 | 1/1990 | Dyksterhouse et al. | 156/181 |
| 4,908,176 | 3/1990 | Kato | 264/122 |
| 4,980,108 | 12/1990 | Suzuki et al. | 264/134 |
| 4,988,469 | 1/1991 | Reavely et al. | 264/113 |
| 4,992,228 | 2/1991 | Heck et al. | 264/135 |
| 5,080,851 | 1/1992 | Flonc et al. | 264/258 |
| 5,080,968 | 1/1992 | Riew et al. | 428/323 |
| 5,094,883 | 3/1992 | Muzzy et al. | 427/185 |
| 5,178,907 | 1/1993 | Reinhart | 427/177 |
| 5,296,064 | 3/1994 | Muzzy et al. | 264/137 |

FOREIGN PATENT DOCUMENTS

| | | |
|---|---|---|
| 2076736 | 3/1993 | Canada . |
| 2168361 | 6/1986 | United Kingdom . |

*Primary Examiner*—Robert B. Davis

[57] ABSTRACT

Preforms for molding processes are prepared by applying an aqueous dispersion of a tackifier onto one or more reinforcement fibers, (2) drying the coated reinforcement fibers to remove the water present and (3) forming one or more of the coated reinforcement fibers into a predetermined shape. The preforms comprise reinforcement fibers having a substantially uniformly distributed tackifier on the surface thereof in the form of a discontinuous film coating.

20 Claims, No Drawings

METHOD FOR PREPARING PREFORMS FOR MOLDING PROCESSES

BACKGROUND OF THE INVENTION

This invention relates to methods for preparing preforms useful in resin transfer molding processes and preforms prepared thereby.

Resin transfer molding is a molding process wherein a reinforcement material, such as fiberglass or other fiber reinforcement material, is positioned within a mold into which resin is subsequently introduced. It is a closed mold, low pressure process applicable to the fabrication of complex, high performance articles of both large and small size. The reinforcement material, hereinafter called "reinforcement fiber," is used to increase the strength of the resin several fold. For some applications involving complicated shapes, it is often desired to use a pre-shaped reinforcement fiber, also known as "preform", which has been coated with a small amount of resin to hold its shape during the molding process. Typically, the preform is positioned within a molding tool cavity and the molding tool is then closed. A feed line connects the closed molding tool cavity with a supply of liquid resin and the resin is pumped or otherwise transferred into the tool cavity where it impregnates and envelops the fiber reinforcement, and subsequently cures. The cured or semi-cured fiber-reinforced plastic product is then removed from the molding cavity.

Processes for making preforms are well known. Such processes employ conventional powder coating techniques to apply a tackifier onto the surface of a reinforcement fiber. In such processes, a tackifier, powder form, is distributed and fused on the surface of the reinforcement fiber. At the low tackifier concentrations utilized in preforming, it is difficult to obtain a uniform tackifier distribution with powder coating techniques due to the electrostatic charge generated on fine powders during the application operations. Uniform distribution of the tackifier is also difficult to achieve because of the high viscosity of the melted tackifier. Furthermore, the large particle size of the tackifier typically used in powder coating methods can cause compaction problems in the preform, making it difficult to obtain the preform thickness required for subsequent molding processes. Other known processes comprise dissolving the tackifier in a suitable solvent and then applying the tackifier solution onto the surface of the reinforcement fiber. However, the tackifier solution leaves a continuous film coating on the surface of the reinforcement fiber which becomes stiff upon evaporation of the solvent which, in turn, makes the coated reinforcement fiber difficult to make into a preform.

It would be desirable to provide a simple process for preparing preforms which contain a more uniformly distributed tackifier and which process does not have the disadvantages associated with the use of powder tackifiers and solution tackifiers.

SUMMARY OF THE INVENTION

In a first aspect, this invention is a process for preparing preforms which comprises (1) applying an aqueous dispersion of a tackifier onto one or more reinforcement fibers, (2) drying the coated reinforcement fibers to remove the water present and (3) forming one or more of the coated reinforcement fibers into a predetermined shape.

In a second aspect, this invention is a process for preparing preforms which comprises (1) applying an aqueous dispersion of a tackifier onto one or more reinforcement fibers in the form of continuous filaments or tows, (2) heating the coated reinforcement fibers to a temperature and for a time sufficient to partially melt the tackifier on the surface of the reinforcement fibers, (3) drying the coated reinforcement fibers to remove the water present, and (4) heating the dried coated reinforcement fibers to a temperature sufficient to produce a rigid preform.

It has been discovered that a more uniform distribution of the tackifier throughout the preform and a better retention of physical properties (for example, shear strength and compressive strength) of composites made from the preform are achieved when an aqueous dispersion of a tackifier, instead of a powder, is used in preparing preforms.

The preforms of the present invention comprise reinforcement fibers having a substantially uniformly distributed tackifier on the surface thereof in the form of a discontinuous film coating.

The preforms of the present invention are useful in preparing fiber-reinforced composites by well known molding processes, such as resin transfer molding.

DETAILED DESCRIPTION OF THE INVENTION

Reinforcement fibers are well known in the art. See, for example, E. G. Kirk-Othmer, *Encyclopedia of Chemical Technology-Supplement*, "Composites, High Performance", pp. 260–281 (J. Wiley & Sons, 1984), which is incorporated herein by reference. Well known reinforcement fibers include quartz, aramid, boron, glass, carbon, or gel-spun polyethylene fibers. The fibers can be unidirectional or multidirectional. They can be monofilament fibers, multifilament fibers, ribbons, strips, a plurality of any one or combinations thereof and the like having regular or irregular cross-section. They may be in the form of woven or non-woven mats or fabric, or in the form of random short fibers. They may also be in the form of fibrous tows or tapes. Preferably, the reinforcement fiber is in the form of a woven or non-woven mat.

Generally, the aqueous tackifier dispersion comprises a tackifier, water and a surfactant which serves as a dispersing or suspending agent. The aqueous tackifier dispersion can be prepared by dispersing the tackifier (usually in the form of a solution in an organic solvent) in water using a suitable surfactant and removing the organic solvent. A suitable process for preparing the aqueous tackifier dispersion is described in U.S. Pat. No. 3,726,824, incorporated herein by reference. If the tackifier is in the form of a solid resin, the aqueous tackifier dispersion can be prepared by dissolving the tackifier in a suitable organic solvent, contacting the tackifier solution with water and surfactant with agitation and then removing the solvent by any conventional means such as, for example, rotary evaporation or vacuum distillation.

As used herein, the term "tackifier" means a resin that exhibits thermoplastic properties, such as resins possessing a glass-transition temperature and/or a melting point below the temperature that cures the resin. The tackifier can also be a thermoplastic-like resin. A "thermoplastic-like" resin is a thermosetting resin that has a glass transition temperature and/or a melting point below the curing temperature of the resin, or a resin that can partially cure at the preforming temperature so that it adheres to the reinforcement but maintains thermoplastic-like properties.

Tackifiers which can be employed in the practice of the present invention in making the preforms are those resinous compounds which are also compatible with the compounds used in subsequent molding processes where the preforms are employed. Suitable tackifiers include, for example, epoxy resins, vinyl ester resins, unsaturated polyester resins, polyimides, bismaleimides, polycyanate ester resins, benzocyclobutene resins and combinations thereof.

Preferred epoxy resins include the polyglycidyl ethers of polyhydric phenols (compounds having an average of more than one phenolic hydroxyl group per molecule) such as, for example, the diglycidyl ethers of biphenol, bisphenols, hydrocarbyl-substituted biphenol, hydrocarbyl-substituted bisphenols, phenol- or hydrocarbyl-substituted bisphenolaldehyde novolac resins, unsaturated hydrocarbon-phenol or hydrocarbyl-substituted phenol resins and mixtures thereof. More preferred epoxy resins are the diglycidyl ethers of bisphenol A having an epoxide equivalent weight of from about 650 to about 750. Most preferred is a diglycidyl ether of bisphenol A having a melting point of 55° to 60° C. and an epoxide equivalent weight of 675 to 750.

Preferred vinyl ester resins include, for example, the acrylates and methacrylates of polyglycidyl ethers of compounds having an average of more than one phenolic hydroxyl group per molecule. More preferred vinyl ester resins are the reaction products of the diglycidyl ether of bisphenol A and acrylic or methacrylic acid, said reaction product having a number average molecular weight of from about 800 to about 1400. Most preferred vinyl ester resin is the reaction product of bisphenol A and acrylic acid having a number average molecular weight of from about 950 to about 1250.

Preferred unsaturated polyester resins include, for example, the reaction products of fumaric acid, and propoxylated or ethoxylated bisphenol A, the reaction products of maleic anhydride and ethoxylated or propoxylated bisphenol A and the pentaerythritol ester of tall oil resin. More preferred unsaturated polyester resins are the reaction products of maleic anhydride and ethoxylated or propoxylated bisphenol A and the pentaerythritol ester of tall oil resin. The most preferred unsaturated polyester resin is the pentaerythritol ester of tall oil resin, commercially available from Union Camp Company as UNI-TAC R100.

Preferred polyimide and bismaleimide resins are described in Stenzenberger, "Recent Advances in Thermosetting Polyimides," 20 , British Polymer Journal pp. 383–396 (1988), incorporated herein by reference. More preferred bismaleimide resins are 4,4'-bismaleimido-diphenylmethane, 1,4-bismaleimido-2-methylbenzene and mixtures thereof; modified and partially advanced modified bismaleimide resins containing Diels-Alder comonomers; and a partially advanced bismaleimide based on 4,4'-bismaleimidodiphenylmethane and allylphenyl compounds or aromatic amines. Examples of suitable Diels-Alder comonomers include styrene and styrene derivatives, bis(propenylphenoxy) compounds, 4,4'-bis(propenyl-phenoxy) sulfones, 4,4'-bis ( propenyl phenoxy ) benzophenones and 4,4'-1-(1-methyl ethylidene) bis(2-(2-propenyl)phenol). Examples of commercially available modified bismaleimides based on 4,4'-bismaleimidodiphenylmethane and an allylphenyl compound, such as diallylbisphenol-A, are Matrimid™ 5292A and Matrimid 5292B from Ciba-Geigy Corporation. Other more preferred bismaleimides include Michael addition copolymers of bismaleimide and aromatic diamines, such as 4,4'-bismaleimidodiphenylmethane/4,4'-diaminodiphenylmethane. Still other more preferred bismaleimides are higher molecular weight bismaleimides produced by advancement reactions of the aforementioned bismaleimide resins. Most preferred bismaleimide resins are those based on 4,4'-bismaleimidodiphenylmethane and 1,4-bismaleimido-2-methylbenzene.

The concentration of the tackifier in the dispersion will vary depending on the particular tackifier used, the form of the reinforcement fiber, the particular coating method used and the application in which the coated reinforcement fiber will be used. In general, the aqueous dispersion has a resin solids content of at least about 0.1 weight percent, preferably at least about 1 weight percent, more preferably at least about 3 weight percent and, most preferably, at least about 29 weight percent, based on the weight of the dispersion. In general, the aqueous dispersion has a resin solids content of not greater than about 70 weight percent, preferably not greater than about 68 weight percent, more preferably not greater than about 65 weight percent and most preferably not greater than about 60 weight percent, based on the weight of the dispersion.

An aqueous dispersion typically consists of finely divided particles distributed throughout an aqueous medium. The particle size distribution of the dispersed particles is seldom uniform in such a dispersion, but the degree of uniformity can be improved by proper selection of surfactant and controlled conditions of the dispersion process.

Dispersing agents which can be employed in the practice of the present invention in preparing the aqueous tackifier dispersion are any dispersing agents known in the art which can aid the formation and stabilization of the tackifier particles in the aqueous medium. Anionic, cationic and nonionic surfactants which emulsify the resins in water are useful as dispersing agents in this invention. Anionic and cationic surfactants are preferred. Saturated and unsaturated $C_{12-30}$ carboxylic acids or salts, sulfated alkylphenoxypoly-(ethyleneoxy)ethanols and alkali or ammonium salts thereof and dialkyl esters of alkali sulfosuccinic acid are more preferred. An example of an alkali salt of a dialkyl ester of sulfosuccinic acid is the dioctyl ester of sodium sulfosuccinic acid commercially available from American Cyanamid as Aerosol™OT. Saturated or unsaturated $C_{12-30}$ carboxylic acids or salts thereof are more preferred. Alkali metals and ammonium ions are the preferred counterions. Most preferred surfactants include, but are not limited to, stearic acid, linoleic acid, linolenic acid, lauric acid, oleic acid and alkali metal salts of disproportionated rosin. An example of commercially available oleic acid is Industrene® 105 available from Humko Chemical. An example of an alkali metal salt of disproportionated rosin is commercially available from Hercules, Inc. as Dresenate™, which is a potassium salt of predominantly abietic acid. Surfactants that have an HLB of about 15 or greater are preferred, and those with an HLB of about 18 or greater are more preferred.

The amount of dispersing agent needed is very small and depends on the nature and characteristic properties of the tackifier employed. The dispersing agent is present in an amount sufficient to emulsify the tackifier(s). Any concentration of the dispersing agent above the critical micelle concentration can be used in the dispersion. However, if the concentration of the dispersing agent used to prepare the dispersion is too high, preforms or composite parts prepared from the aqueous dispersions may not have the required mechanical properties since the dispersing agent will remain in the preforms and composites. The term "critical micelle concentration" means the concentration of dispersing agent above which it phase separates from the aqueous solution to form micelles. In general, the dispersing agent is present in an amount of at least about 0.1 weight percent, preferably at least about 0.25 weight percent, more preferably at least about 0.5 weight percent and most preferably at least about 1.0 weight percent, based on the weight of the dispersion. In general, the dispersing agent is present in an amount of at most about 4 weight percent, preferably not greater than about 3 weight percent, more preferably not greater than about 2 weight percent and most preferably not greater than about 1.5 weight percent, based on the weight of the dispersion.

The amount of tackifier applied to the substrate should be sufficient to hold the fibers in the desired shape and position but small enough to leave the resulting preform porous so that it can be readily impregnated with matrix resin during subsequent molding processes. Generally, the tackifier is applied in an amount, on a solids basis, of at least about 0,001 weight percent, preferably at least about 0.25 weight percent, more preferably at least about 1 weight percent and most preferably at least about 3 weight percent, based on the weight of the reinforcement fibers. Generally, the tackifier is applied in an amount, on a solids basis, of not greater than about 15 weight percent, preferably not greater than about 13 weight percent, more preferably not greater than about 11 weight percent and most preferably not greater than about 10 weight percent, based on the weight of the reinforcement fibers.

The aqueous tackifier dispersion may be applied to the reinforcement fibers by known techniques such as dip coating, nip coating, spray coating, brush coating, kiss rolls, trailing blade, flexographic, inverted knife, polishing bar, wire-wound doctor, direct gravure, offset gravure, two-roll pressure, three-roll pressure, and the like.

A typical dip coating method employs a coating setup which includes a feed spool that supplies the filaments to be coated, a spreading mechanism to separate the fibers into their single fibrils, a coating bath, a drying mechanism and a take up winder. The spreading mechanism to separate the tows are known and described, for example, in U.S. Pat. Nos. 5,042,111 and 5,094,883, both of which are incorporated herein by reference. The spreading mechanism separates multifilament tows into their single filaments or fibrils, so that upon contact with the coating bath, the fibrils are well wet by the dispersion. This would allow the tackifier particles to be deposited on the individual fibrils and obtain a more uniform distribution of the particles on the tow.

The coating bath is a box containing a few sets of rollers which guide the fibrils through the coating dispersion. The dispersion in the bath is diluted to control the level of pick up. As spread fibers go through this bath, the suspended particles get coated onto the single fibrils of the tow. The bath volume and the line speed determine the residence time of the fibers within the bath, which in turn influences the concentration for resin applied on the fibers. During the coating process, the concentration of the solid particles in the bath decrease which requires periodic replenishment of the bath with the dispersion to maintain the bath concentration.

Following the coating bath, a set of convection oven/ heating lamps provide the energy necessary to drive off water and produce partial melting of the resin particles onto the fibrils. In this section of the set up, only partial melting is achieved. If complete melting of the particles occurs, the individual fibrils would form a completely sintered tow that is stiff and not useful for braiding, weaving or filament winding. On the other hand, partial melting of the particles ensures that the tackifier particles adhere well to the fibrils without causing consolidation of the tow. After the drying step, the fiber tow goes through a die to regroup the fibrils to the original tow dimensions and is taken up by a winder.

Advantageously, the coated reinforcement fibers are dried to remove the water present by conventional methods such as, for example, air-drying at room temperature or drying in a forced-air oven, infrared heating units or microwave heating units. Preferably, the coated reinforcement fibers are dried to a water content of less than about 5 weight percent, more preferably less than about 4 weight percent, and most preferably less than about 3 weight percent, based on the weight of the coated reinforcement fibers. When drying at temperatures higher than room temperature, the length of time and temperature conditions must be such that the water is evaporated and the tackifier is partially melted or fused on the reinforcement substrate. It is important that the temperature and length of time of drying is sufficient to partially, but not completely melt, the resinous compound. Melting the resinous compound completely will cause the coated reinforcement fibers to become stiff and difficult to process.

If the coated reinforcement fiber is in the form of continuous filaments or tows, it can be braided, woven or filament-wound, to obtain three-dimensional objects. The braided or woven objects can be heated to a temperature sufficient to fuse or melt the tackifier, and then cooled to room temperature in the desired shape to obtain a rigid preform that can then be subsequently molded.

Preforms can be prepared from the coated substrates in accordance with the present invention by forming one or more of the coated reinforcement fibers into a predetermined shape. Advantageously, the shaped coated reinforcement fibers are subsequently debulked. As used herein, the term "debulk" means applying heat and pressure sufficient to adhere the tackifier to the surface of the fibers and compress the fibers to the proper thickness to ease loading into a mold, but insufficient to melt the tackifier to form a continuous coating on the surface of the shaped, debulked fibers. Although not intended to be bound by theory, it is believed that the tackifier remains evenly dispersed throughout the preform after preforming, resulting in an even distribution of bonds across the preform that allow easy impregnation with a matrix resin during the molding process.

The preforms of the present invention are useful in preparing fiber-reinforced composites by well known molding processes, such as resin transfer molding. Resin transfer molding is described, for example, in *Plastics Engineering Handbook of the Society of the Plastics Industry, Inc.* Fourth Edition, pp. 220–229, incorporated herein by reference. The fiber-reinforced composites and shaped articles containing them are useful for structural materials and parts.

Composites are well known in the art and are described, for example, in Kirk-Othmer Ency. Chem., Tech.—Supp., *Composites, High Performance*, pp. 260–281 (J. Wiley & Sons 1984). A composite typically comprises a plurality of fibers (reinforcement fibers) embedded in a plastic (the matrix). Typically, the fibers give strength and/or stiffness to the composite, and the matrix maintains fiber orientations and spacings, transmits shear loads between layers of fibers so that they resist bending and compression and protects the fiber from surface damage.

Individual plies of preform may optionally be shaped or laminated together (a thermoforming step) after the tackifier is applied to the reinforcement fibers. For instance, multiple plies may be pressed together at a temperature above the glass transition melting or softening temperature of the tackifier. Likewise, individual preforms or laminates may be molded or shaped at a temperature that is above the glass transition melting or softening temperature of the tackifier. Examples of shaping and laminating different preforms are described in U.S. Pat. No. 4,992,228 and U.S. Pat. No. 5,080,851, both of which are incorporated herein by reference.

The following working examples and comparative examples are given to illustrate the invention and should not be construed to limit its scope. Unless otherwise indicated, all parts and percentages are by weight.

The following materials are used in the examples:

Resin A is a diglycidyl ether of bisphenol A having a melting point of 55° to 60° C., an epoxide equivalent weight of 675 to 750, available from The Dow Chemical Company as D.E.R.™ 662 UH epoxy resin.

Resin B is a diglycidyl ether of bisphenol A having a viscosity of 4400 cps to 5600 cps (4.4 to 5.6 Pa·s) at 25° C., an epoxide equivalent weight of 172 to 176 and is commercially available from The Dow Chemical Company as TACTIX™ 123 epoxy resin.

Resin C is a bismaleimide resin blend having a viscosity of 50 cps at 130° C. and is commercially available from Cytec as 5250-RTM.

Resin D is a bismaleimide resin having a viscosity of about 2000 cps at 150° C. This resin is prepared in accordance with the method described in Example 2 of copending U.S. application Ser. No. 59,153 filed on May 7, 1993, incorporated herein by reference.

Hardener A is a cycloaliphatic diamine having a viscosity of 8 to 12 cps (0.008 to 0.12 Pa·s) at 25° C., an amine equivalent weight of 28 to 29 and is commercially available from Milliken Chemical Company as Millamine™5260.

EXAMPLE 1

A. Preparation of Aqueous Dispersion of Resinous Compound

A 70 weight percent solution of Resin A in toluene is prepared. An aqueous dispersion containing 46 weight percent tackifier is prepared from this solution. The dispersing agent used is Alipal™ CO-436 sulfated nonylphenoxy poly-(ethyleneoxy) ethanol at 2.5 percent by weight based on Resin A. The solvent is removed and the dispersion is concentrated to 58 percent solids by weight. The resulting dispersion contains resin particles having an average diameter of 0.64 μm and is easily dilutable with water to provide lower tackifier concentrations for control of coating operations.

B. Preparation of Preforms

Graphite fabric AW370-8H (Hercules, Inc., Magna, Utah) with epoxy sizing is cut into (10×12 inch) (25.4×30.48 cm) pieces. Using a spray bottle, the graphite pieces (plies) are spray-coated on one side with the aqueous dispersion prepared in Part A to deposit onto the plies from 4 to 4.5 weight percent Resin A, based on the weight of the fabrics. The individual coated plies are dried for 30 minutes at room temperature, further dried in an oven at 110° C. (230° F.) for 30 minutes and cooled to room temperature. A visual examination of the dried coated plies reveals a substantially uniformly distributed discontinuous film coating of the tackifier on their surfaces. To prepare an eight-ply preform, eight of the coated pieces are stacked, aligned and prepared for debulking. Debulking is done by vacuum bagging. The stacked pieces are placed on a baseplate covered with tetrafluoroethylene film. Felt is placed around the fabric leading to a vacuum port and covered with a bag material. The whole assembly is placed under a vacuum of 30 inch Hg and heated to 93° C. (199° F.) and maintained at this temperature for 30 minutes. The assembly is allowed to cool to room temperature under vacuum and the finished eight-ply preform is removed from the vacuum bag.

EXAMPLE 2

Preparation of Three-Dimensional Preforms

Following the procedure of Part A of Example 1, an aqueous dispersion of Resin A having a 29.1 percent solids concentration is prepared. Eight mats of graphite fabric AW370-8H (Hercules, Inc., Magna, Utah) are coated with the aqueous dispersion using an air brush. Three to five weight percent of Resin A, based on the weight of the fabric, are deposited on the mats. The coated mats are allowed to air-dry at room temperature for 2 hours. A visual examination of the dried coated mats reveals a substantially uniformly distributed discontinuous film coating of the tackifier on the mat surfaces. After air-drying, the mats are cut into 6× 8.5 inch (15.24×21.6 cm) pieces. Eight pieces are laid on top of each other, aligned and placed on a mold to obtain a C-shaped preform. The whole assembly is prepared for vacuum bagging following the procedure of Example 1. Vacuum bagging is performed at 95° C. (203° F.) for 90 minutes. The assembly is cooled to room temperature maintaining a 30 inch Hg vacuum. The three-dimensional preform is then removed from the vacuum bag.

Comparative Example A

Preparation of Control Preforms

Graphite fabric AW370-8H (Hercules, Inc., Magna, Utah) with epoxy sizing is cut into (10×12 inch) 25.4×30.48 cm) rectangles. Eight layers of fabric are stacked, aligned and debulked following the procedure described in Example 1.

Comparative Example B

Preparation of Powder Coated Preforms

Graphite fabric AW370-8H (Hercules, Inc. Magna, Utah) with epoxy sizing is cut into (10×12 inch) (25.4×30.48 cm) rectangles. Resin A ground to 100 mesh powder, as described in U.S. Pat. No. 4,992,228, is evenly sprinkled on seven of the fabric plies using a 100 mesh sieve. The seven coated plies are stacked and aligned. An eighth ply (not coated) was placed on top of the assembly. The amount of tackifier employed is 4.2% by weight of graphite fabric. The assembly is debulked following the procedure described in Example 1.

EXAMPLE 3

A. Preparation of Composite Panel

The preforms prepared in Example 1 and Comparative Examples A and B are placed in a mold cavity and the mold is heated to a temperature of from 60° C. to 65° C. (140° F. to 150° F.). Resin B and Hardener A are mixed at 35° C. to 40° C. (90° F. to 110° F.) and the resulting resin formulation is introduced into the mold cavity at this temperature under a back pressure of 50 psi. After 10 minutes, the back pressure is increased to 90 psi. The injection period is 30 minutes. The mold temperature is raised to 177° C. (350° F.) at a rate of about 3° C./min (6° F./min). The mold temperature is held at 177° C. for 30 minutes and lowered to 40° C. (104° F.) at a rate of about 3° C./min (6° F./min). After molding, all panels are simultaneously post-cured for 120 minutes at 177° C. (350° F.).

B. Conditioning of Composite Sample

The composite samples which are to be tested wet for mechanical properties are first dried for three days at 80° C. (176° F.). They are then placed in boiling water for two weeks and tested immediately upon their removal.

The compressive test specimens required tabs which measured 5.72 cm (2.25 inches) long by the width of the sample. Tabs are adhered to both sides of the samples at both ends with American Cyanamid's FM123-2 adhesive film, an epoxy resin which requires a cure of one hour at 100° C. (212° F.). Tabs are made from G-10FR grade epoxy resin/ glass sheet, 0.157 cm (0.062 inches) thick, obtained form Norplex-Oak Company.

C. Testing of Composite Panel

The mechanical properties of the composite panels are determined using an Instron Model 1127 tensile testing machine with a 50,000 pound load cell. The short beam shear tests are conducted following ASTM DD-2344. The compressive tests are performed following ASTM D-3410, the IITRI compressive test procedure. The test results are shown in Table I. Values in parenthesis represent the standard deviation of the measurements.

TABLE I

Compressive and Short Beam Shear Results

| Composite Description | | Short Beam Shear Strength | Compressive Strength |
| --- | --- | --- | --- |
| Control, no binder | dry | 8.81 (0.22) (ksi) 61 (1.5) (MPa) | 67.4 (8.4) (ksi) 467 (58) (MPa) |
| | wet | 8.10 (0.18) (ksi) 56 (1.2) (MPa) | 61.4 (4.5) (ksi) 423 (31) (MPa) |
| Aqueous dispersion coated preform, 4.17% by weight | dry | 9.03 (0.35) (ksi) 62.3 (2.4) (MPa) | 58.8 (3.4) (ksi) 406 (23) (MPa) |
| | wet | 8.41 (0.25) (ksi) 58 (1.7) (MPa) | 60.5 (7.3) (ksi) 417 (50) (MPa) |
| Powder coated preform, 4.2% by weight | dry | 6.92 (0.93) (ksi) 48 (6.4) (MPa) | 54.8 (5.4) (ksi) 378 (37) (MPa) |
| | wet | 6.62 (0.98) (ksi) 46 (6.7) (MPa) | 50.8 (2.8) (ksi) 350 (19) (MPa) |

The data in the above table show that there is better retention of composite properties on parts made from preforms prepared with the aqueous tackifier dispersions of the present invention.

EXAMPLE 4

Preparation of Aqueous Dispersion Coated Preforms

Graphite fabric AW370-8H (Hercules, Inc. Magna, Utah) with epoxy sizing is cut into (2 in.×3 in.) (5.08 cm×7.62 cm) rectangles (mats). An aqueous dispersion of Resin C is prepared as in Example 1. The dispersion has 44% solids concentration and average particle diameter of 0.7 micrometers. The dispersion is sprayed on two mats by means of a spray bottle to obtain a tackifier concentration of approximately 13% by weight of graphite fabric. Once sprayed, the individual mats are air-dried for 30 minutes at room temperature. The coated mats are stacked, aligned and debulked following the procedure described in Example 1. The resulting preform showed high rigidity and adhesion between the plies.

EXAMPLE 5

Preparation of Aqueous Dispersion Coated Preforms

Graphite fabric AW370-8H (Hercules, Inc. Magna, Utah) with epoxy sizing is cut into (2 in.×3 in.) (5.08 cm×7.62 cm) rectangles (mats). An aqueous dispersion of Resin D is prepared as in Example 1. The dispersion has 30% solids concentration and average particle diameter of 1.2 micrometers. The dispersion is sprayed on two mats by means of a spray bottle to obtain a tackifier concentration of approximately 13% by weight of graphite fabric. Once sprayed, the individual mats are air-dried for 30 minutes at room temperature. The coated mats are stacked, aligned and debulked following the procedure described in Example 1. The resulting preform showed high rigidity and adhesion between the plies.

EXAMPLE 6

A. Coating of Tows

The setup utilized to perform tow coating is as described previously. The tow utilized is unsized IM7-12K tow form Hercules Inc. An aqueous dispersion of Resin A is prepared as in Example 1. The dispersion has 58.2% solids content with an average particle size of approximately 0.6 micrometers. A 24:1 dilution ratio is used to obtain the appropriate resin concentration on the fibers. At line speeds of approximately 2 cm/sec., a concentration of Resin A of 3 to 5% by weight of uncoated fibers are deposited on the tows. The coated tow obtained has the flexibility and handling characteristics of the uncoated tow. This would allow further processing such as weaving, braiding and filament winding. The resin particles are uniformly distributed on the individual fibrils. The average particle size is smaller than the fiber diameter and the particles partially melted on the fibrils.

B. Consolidation of Coated Tow

IM7-12K tow coated as described in Part A of this example is heated to approximately 110° C. for a few minutes and allowed to cool down to room temperature. The resulting tow is rigid and stiff, having the consistency and stiffness of a graphite lead. This shows the ability of the coated tow to form a rigid preform useful for resin transfer molding.

What is claimed is:

1. A method for preparing preforms which comprises (1) coating one or more reinforcement fibers with an aqueous dispersion of a tackifier, (2) drying the coated reinforcement fibers at a temperature and for a time sufficient to remove the water present and to partially, but not completely, melt the tackifier and (3) forming the coated reinforcement fibers into a preform.

2. The method of claim 1 wherein the tackifier is an epoxy resin, a vinyl ester resin, unsaturated polyester resin, polycyanate ester resin, benzocyclobutene resin, polyimide, bismaleimide, or mixtures thereof.

3. The method of claim 2 wherein the epoxy resin is a diglycidyl ether of biphenol, bisphenol, hydrocarbyl-substituted biphenol, hydrocarbyl-substituted bisphenol, phenol- or hydrocarbyl-substituted bisphenol-aldehyde novolac resin, unsaturated hydrocarbon-phenol or hydrocarbyl-substituted phenol resin.

4. The method of claim 3 wherein the epoxy resin is a diglycidyl ether of Bisphenol A having an epoxide equivalent weight of from about 650 to about 750.

5. The method of claim 2 wherein the vinyl ester resin is the reaction product of bisphenol A and acrylic acid and having a number average molecular weight of from about 950 to about 1250.

6. The method of claim 2 wherein the unsaturated polyester resin is the reaction product of fumaric acid and propoxylated or ethoxylated bisphenol A, the reaction product of maleic anhydride and ethoxylated or propoxylated bisphenol A or the pentaerythritol ester of tall oil resin.

7. The method of claim 2 wherein the bismaleimide resin is 4,4'-bismaleimidodiphenylmethane or 1,4-bismaleimido-2-methylbenzene, a modified bismaleimide containing Diels-Alder comonomers, a partially advanced modified bismaleimide containing Diels-Alder comonomers, or a partially advanced bismaleimide based on 4,4'-bismaleimidodiphenylmethane and allylphenyl compounds or aromatic amines.

8. The method of claim 1 wherein the aqueous dispersion has a resin solids content of at least about 0.1 weight percent, based on the weight of the dispersion.

9. The method of claim 1 wherein the aqueous dispersion has a resin solids content of at least about 29 weight percent, based on the weight of the dispersion.

10. The method of claim 1 wherein the aqueous dispersion has a resin solids content of not greater than about 70 weight percent, based on the weight of the dispersion.

11. The method of claim 1 wherein the tackifier is applied to the reinforcement fiber in an amount of at least about 0,001 weight percent solids, based on the weight of the reinforcement fibers.

12. The method of claim 1 wherein the tackifier is applied to the reinforcement fiber in an amount of at least about 3 weight percent, based on the weight of the reinforcement fibers.

13. The method of claim 1 wherein the tackifier is applied to the substrate in an amount of not greater than about 15 weight percent, based on the weight of the reinforcement fibers.

14. The method of claim 1 wherein step (3) comprises drying the coated reinforcement fibers to a water content of less than about 5 weight percent, based on the weight of the coated reinforcement fibers.

15. The method of claim 1 which further comprises the step of debulking the shaped, coated reinforcement fibers.

16. The method of claim 1 wherein the reinforcement fiber is in the form of a woven or non-woven mat.

17. A method for preparing preforms which comprises applying an aqueous dispersion of a tackifier onto one or more reinforcement fibers in the form of continuous filaments or tows, heating the coated reinforcement fibers to a temperature and for a time sufficient to remove the water present and to partially melt the tackifier on the surface of the reinforcement fibers, and forming the coated reinforcement fibers into a preform.

18. A method for preparing preforms which comprises the sequential steps of (1) coating one or more reinforcement fibers with an aqueous dispersion of a tackifier, (2) Forming one or more of the coated reinforcement fibers into a preform and (3) drying the coated reinforcement fibers at a temperature and for a time sufficient to remove the water present and to partially, but not completely, melt the tackifier.

19. The method of claim 1 wherein the preform has a substantially uniformly distributed tackifier on the surface thereof in the form of a discontinuous coating.

20. The method of claim 18 wherein the preform has a substantially uniformly distributed tackifier on the surface thereof in the form of a discontinuous coating.

* * * * *